United States Patent [19]

Spelthann

[11] Patent Number: 5,434,217

[45] Date of Patent: Jul. 18, 1995

[54] FLEXIBLE POLAR THERMOPLASTIC POLYOLEFIN COMPOSITIONS

[75] Inventor: Heinz H. Spelthann, Geneva, Switzerland

[73] Assignee: E. I. Du Pont de Nemours and Company, Wilmington, Del.

[21] Appl. No.: 205,439

[22] Filed: Mar. 4, 1994

[51] Int. Cl.[6] .................... C08F 255/02; C08G 67/02; C08L 23/02
[52] U.S. Cl. ......................................... 525/63; 525/71; 525/74; 525/185; 525/190
[58] Field of Search ...................... 525/74, 71, 63, 185, 525/190

[56] References Cited

U.S. PATENT DOCUMENTS

| | | | |
|---|---|---|---|
| 4,070,532 | 1/1978 | Hammer | 525/451 |
| 4,157,428 | 6/1979 | Hammer | 525/451 |
| 4,927,888 | 5/1990 | Strait et al. | 525/285 |
| 5,089,556 | 2/1992 | Tabor et al. | 525/539 |

FOREIGN PATENT DOCUMENTS 9302139  2/1993  WIPO .

*Primary Examiner*—Thomas Hamilton, III
*Attorney, Agent, or Firm*—Craig H. Evans

[57] ABSTRACT

Polar thermoplastic polyolefin blends are provided which are flexible and are particularly useful in replacing polyvinyl chloride sheeting used as liners, folders, etc. The blends comprise, in general, a non-polar thermoplastic polyolefin, a functionalized polar ethylene copolymer, and a functionalized olefin polymer as a compatibilizing agent, all of which are chlorine-free.

11 Claims, No Drawings

FLEXIBLE POLAR THERMOPLASTIC POLYOLEFIN COMPOSITIONS

BACKGROUND OF THE INVENTION

1. Field of Invention

This invention relates to polyolefin compositions and more particularly to such compositions which are flexible and polar, and to shaped articles made from them.

2. Background Discussion

Polyvinyl chloride (PVC) sheets have been on the market for many years and have been the standard liner material in the housing industry. PVC sheets are characterized by being flexible over a variable temperature range, heat-sealable, and oil-resistant. However, with the trend toward a chlorine-free environment, there is a need for a PVC sheeting alternative. Ethylene/propylene/diene monomer (EPDM) rubbers are alternatives, but these are difficult to seal. Thus, there is a need for PVC-free sheets which are thermoplastic and heat-sealable, halogen-free and flexible.

SUMMARY OF THE INVENTION

According to the present invention there is provided a flexible, nonhalogen-containing polymer composition which comprises a blend of:

(1) 50–98% by weight of a non-polar polyolefin;

(2) 1–25% by weight of a compatibilizing polymer which is an olefin polymer containing less than 20% by weight of a copolymerized polar monomer, and containing 0.01–10% by weight of reactive groups selected from the group consisting of glycidyl acrylate or methacrylate and a carboxylic acid or a derivative thereof; and (3) 1–49% by weight of a polar ethylene copolymer consisting essentially of:

(a) 30–80% by weight of ethylene;

(b) 0–60% by weight of at least one copolymerizable, ethylenically unsaturated organic compound; and (c) 3–30% by weight of carbon monoxide;

said polar copolymer containing 0.01–10% by weight of reactive groups selected from the group consisting of a carboxylic acid or a derivative thereof, and glycidyl acrylate or methacrylate, said groups selected reactable with the groups contained in said compatibilizing polymer.

Also provided is a shaped article such as a sheet or film made from the aforesaid composition.

DETAILED DESCRIPTION OF THE INVENTION

The invention relates to flexible, nonhalogen-containing thermoplastic polymer blends which are useful in sheet form as liners for roofing, etc. or for making folders, and in film form as packaging films. These blends generally are formed by combining a non-polar thermoplastic polyolefin and a soft, polar thermoplastic ethylene copolymer. Reactive compatibilizing agents are used in order to affect the blend and to give good properties to the resulting shaped article. Such polymer blends can be formed into sheets, films, and other shaped articles which have many properties comparable to polyvinyl chloride (PVC), but with better elongation and with no chlorine.

The term "non-polar thermoplastic polyolefin" (component (1) means any polyolefin polymer which is thermoplastic but which excludes polar ethylene copolymers as defined herein. The blends of the invention contain 50–98% of a polyolefin, preferably 60–90% by weight. In general, these polyolefins will have a melt flow index (MFI) in the range of 0.01–100 g/10 min., preferably less than 5 g/10 min. as determined by ASTM D-1238 (measured at 2,16 kg and 190° C. or 230° C. depending on the polyolefin used) and are well-known in the art. Useful and preferred polyolefins are high density polyethylene (HDPE) and polypropylene. Other polyolefin homopolymers and copolymers of ethylene can be utilized in the practice of this invention. Such other polyolefins include low density polyethylene (LDPE), very low density polyethylene (VLDPE), linear low density polyethylene (LLDPE) and polybutylene (PB). However, these other polyolefins can be blended with other polyolefins such as polypropylene ("PP") or high density polyethylene ("HDPE"). As used herein the term "polypropylene" includes homopolymers of propylene as well as copolymers of polypropylene which can contain about 1 to about 20 weight percent ethylene or an alpha olefin comonomer of 4 to 16 carbon atoms. The polypropylene can be highly crystalline isotactic or syndiotactic polypropylene. The copolymer can be either a random or block copolymer. The density of the PP or copolymer can be from about 0.88 to about 0.92 g/cc; generally, from about 0.89 to about 0.91 g/cc.

High density polyethylene useful as a polyolefin resin of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

Low density polyethylene (LDPE) as used herein means both low and medium density polyethylene having densities of about 0.910 to about 0.940 g/cc. The terms include linear polyethylene as well as copolymers of ethylene which are thermoplastic resins, but non-polar.

Very low density polyethylene (VLDPE) is used herein to mean polyethylene having a density below about 0.910 g/cc and includes linear polyethylene as well as copolymers of ethylene which are thermoplastic resins, but non-polar.

Linear low density polyethylene (LLDPE) is a class of low density polyethylene characterized by little, if any, long chain branching, in contrast to conventional LDPE. The processes for producing LLDPE are well known in the art and commercial grades of this polyolefin are available. The term LLDPE means copolymers of ethylene and other alpha-olefins such as 1-butene, 1-hexene, and 1-octene. Useful LLDPEs have both high and low molecular weights. Such copolymers with 1-butene tend to be more crystalline and thus are more useful as roofing liners; whereas such copolymers with 1-octene are clearer and perhaps more useful in packaging applications. The LLDPEs are preferred.

Polybutylene includes both poly(1-butene) homopolymer and a copolymer with, for example, ethylene, propylene, pentene-1, etc. Commercially useful products are of high molecular weight and isotacticity. A variety of commercial grades of both homopolymer and ethylene-butene-1 copolymers are available with melt flow indices that range from about 0.3 to about 20 g/10 min.

Any of the aforesaid olefin polymers can also be blended with 10% to 70% by weight (preferably 10–40%) of an ethylene-propylene copolymer rubber (EP), or an ethylene/propylene/nonconjugated diene copolymer rubber (EPDM), both of which are well-known in the art. The nonconjugated dienes can contain from 6–22 carbon atoms having at least one readily polymerizable double bond. The ethylene/propylene copolymer rubber contains about 60–80 weight percent, usually about 65–75 weight percent ethylene. The amount of nonconjugated diene, when used, is generally from about 1–7 weight percent, usually 2–5 weight percent. Preferably the ethylene/propylene copolymer rubbers are EPDM copolymers. EPDM copolymers that are especially preferred are ethylene/ propylene/1.4-hexadiene, ethylene/propylene/dicylopentadiene, ethylene/propylene/norbornene, ethylene/propylene/methylene-2-norbornene, and ethylene/propylene/1.4-hexadiene/norbornadiene copolymers. These polymeric rubbers will generally have a Mooney viscosity as measured by ASTM D-1646 (1+4/121° C.) in the range of 20–50. Blends of polypropylene with EP rubbers are available commercially from Himont Inc. as elastomeric polyolefins and are sold under the name HIFAX (e.g. HIFAX FX 7023 XEP; HIFAX FX 7036 XCP).

Compatibilizing polymer (2) is an olefin polymer such as described above, which has been functionalized by copolymerizing or grafting a carboxylic acid or derivative thereof (such as an anhydride) or glycidyl acrylate or methacrylate to the polymer by known processes. The blends of the invention contain 1–49% by weight of this polymer, preferably 1–25%, and most preferably 5–20%. Any of the above-described non-polar thermoplastic polyolefins (including the EP and EPDM rubbers) can be subjected to the functionalizing process. While up to 20% by weight of a polar monomer can be used, it is preferred to use non-polar monomers. A polyolefin is graft modified with 0.01 to 10.0 weight percent, preferably 0.5 to 2 weight percent, of a carboxylic acid or a derivative thereof. The grafting of the polyolefin can be carried out in the melt state, in solution or in suspension as described in the state-of-the-art literature. The melt viscosity of the modified polyolefin is not restricted, however, most effective compatibilization with modified polypropylene is found if the melt index, measured according to ASTM D-1238 (at 2.16 kg and 190° C.) is between 50 to 150 g/10 min. and with modified polyethylene if the melt index (measured at 2.16 kg and 190° C.) is less than 6 g/10 min., respectively. Glycidyl acrylate or methacrylate, or maleic anhydride is the preferred functionalizing agent. If glycidyl acrylate or methacrylate is used to functionalize the olefin polymer, then maleic anhydride is used to functionalize the polar ethylene copolymer. Such modified polyolefins can be prepared as described, for example, in published European Patent Application Nos. 370,735 and 370,736.

Polar ethylene copolymers (3) useful in the blends of this invention and their preparation are described in U.S. Pat. No. 3,780,140 to Hammer, the description of which is incorporated by reference. The blends of the invention contain 1–25% by weight of polar ethylene copolymers, preferably 5–20%.

These polar ethylene copolymers preferably consist essentially of ethylene, carbon monoxide and one or more termonomers which are chlorine-free and are copolymerizable ethylenically unsaturated organic compounds. Such termonomers are selected from the class consisting of non-chlorine containing unsaturated mono- and dicarboxylic acids of 3–20 carbon atoms, esters of such unsaturated mono- or dicarboxylic acids, vinyl esters of saturated carboxylic acids wherein the acid group has 1–18 carbon atoms, vinyl alkyl ethers wherein the alkyl group has 1–18 carbon atoms, acrylonitrile, methacrylonitrile, copolymerizable unsaturated hydrocarbons such as alpha-olefins of 3–12 carbon atoms, ring compounds such as norbornene and vinyl aromatic compounds.

In particular, these copolymers consist essentially of, by weight, (a) 30–80% ethylene, (b) 3–30% carbon monoxide, and (c) 5–60% of one or more termonomers copolymerizable therewith to produce solid copolymers. Preferred copolymers include those consisting essentially of 56–76% ethylene, 3–15% carbon monoxide, and 10–34% of said termonomer(s). More preferred copolymers include those in which vinyl acetate or an alkyl (1–8 carbons) acrylate or alkyl methacrylate (particularly n butyl acrylate) is the termonomer. The copolymers normally have a melt flow index within the range 0.1–1000 g/10 min., preferably 1–500, measured according to ASTM D-1238. Most preferably, the melt index is less than 100 g/10 min.

The polar ethylene copolymers as described above are grafted with 0.01–10% (preferably 0.5–2%) by weight of reactive groups selected from glycidyl acrylate or methacrylate, and of an alpha, beta-unsaturated carboxylic acid or a derivate thereof. If a glycidyl acrylate or methacrylate is used to functionalize the olefin polymer compatibilizing polymer (2), then the polar ethylene copolymer (3) is functionalized with a carboxylic acid or a derivative thereof. The reverse also applies. The epoxy and acid groups are reactable and do react under melt-processing or blending conditions so as to obtain a compatible polymer composition.

The preferred grafting monomer for the polar ethylene copolymer is at least one of alpha, beta-ethylenically unsaturated carboxylic acids and anhydrides, including derivatives of such acids and anhydrides, and including mixtures thereof. Examples of the acids and anhydrides, which may be mono-, di- or polycarboxylic acids, are acrylic acid, methacrylic acid, maleic acid, fumaric acid, iraconic acid, crotonic acid, itaconic anhydride, maleic anhydride and substituted maleic anhydride e.g. dimethyl maleic anhydride. Examples of derivatives of the unsaturated acids are salts, amides, imides and esters e.g. mono- and disodium maleate, acrylamide, maleimide and diethyl fumarate. Maleic anhydride is preferred. Grafting can be carried out using conditions similar for the grafting of polyolefins described above.

The blends of the invention can be prepared by mixing the polymeric ingredients and optional additives by use of conventional masticating equipment, for example, a rubber mill, Brabender Mixer, Banbury Mixer, Buss-ko kneader, Farrel continuous mixer, or twin screw continuous mixer. Mixing times should be sufficient to obtain homogeneous blends. Satisfactory mixing times depend upon the types of polymers and upon the type and amount of compatibilizer. Typically, mixing times of about 5 minutes are satisfactory. If the polymer blend is obviously non-homogeneous, additional mixing is required.

In addition to its polymer components, the composition of this invention can include reinforcing and nonreinforcing fillers, antioxidants, stabilizers, lubricants (e.g., oleamide), antiblocking agents, antistatic agents, waxes, coupling agents for fillers, pigments, fire retardants, titanium dioxide, talc and other processing aids known in the polymer compounding art. These pigments and other additives comprise 0 to about 50 weight percent of the total composition preferably 5 to 30 weight percent of a filler.

The invention can be further understood by the following examples in which parts and percentages are by weight and temperatures are in degrees Celsius.

DESCRIPTION OF THE PREFERRED EMBODIMENTS

Examples 1-3

Polymeric blends were prepared by melt compounding 80% of an ethylene-propylene rubber copolymer modified polypropylene (20% EP rubber), 5-20 % of an ethyleneterpolymer (57% ethylene, 30% n-butylacrylate , and 13% carbonmonoxide) having a MFI (190°/2.16 kg)=4 grafted with 0.2-0.3% maleic anhydride (MAH), and 5-15% of an ethylene-propylenediene terpolymer grafted with 0.86% glycidyl methacrylate (EPDM-g-GMA) having a MFI (280°/2.16 kg)=1.2. The EP-modified polypropylene had a MFI (230°/2.16 kg) of 0.8 g/10 minutes (ASTM D1238) and is sold by Himont Inc. as HIFAX FX 7036 XCP.

Melt compounding of each blend was carried out in a Brabender internal mixer with batches from 45-50 grams at 190° at a speed of 80 rpm for ca. 5 minutes. The melt then was removed and sheeted out on a a laboratory two roll mil at 170°. The milled sheet then was formed into a testing plaque in a hydraulic press at 180° for 5 minutes. Afterwards, stress-strain testing (ASTM D-638) was carried out. Results are shown in Table 1.

TABLE 1

| Example Number | 1 | 2 | 3 | Control 1 | Control 2 |
|---|---|---|---|---|---|
| PP-EP rubber | 80 | 80 | 80 | 80 | 100 |
| EnBACO-g-MAH | 15 | 10 | 5 | 20 | — |
| EPDM-g-GMA | 5 | 10 | 15 | — | — |
| Properties | | | | | |
| TS (MPa) | 15.9 | 16.7 | 15.9 | 16 | 22 |
| EB (%) | 780 | 800 | 780 | 720 | 810 |
| EB/Y | 16 | 23 | 27 | 21 | 14 |

Addition of a glycidyl methacrylate grafted ethylenepropylenediene terpolymer to a blend of a maleic anhydride grafted polar, elastomeric ethylene copolymer and a non-polar, thermoplastic polyolefin has greater flexibility than the pure elastomerthermoplastic blend as shown by the better elongation properties.

What is claimed is:

1. A flexible nonhalogen-containing polymer composition which comprises a blend of:
   (1) 50-98% by weight of a non-polar thermoplastic polyolefin,
   (2) 1-25% by weight of a compatibilizing polymer which is an olefin polymer containing less than 20% by weight of a copolymerized polar monomer, and containing 0.01-10% by weight of reactive groups selected from the group consisting of glycidyl acrylate or methacrylate and a carboxylic acid or a derivative thereof; and
   (3) 1-49% by weight of a polar copolymer consisting essentially of:
   (a) 30-80% by weight of ethylene;
   (b) 0-60% by weight of at least one copolymerizable, ethylenically unsaturated organic compound; and
   (c) 3-30% by weight of carbon monoxide;
   said polar copolymer containing 0.01-10% by weight of reactive groups selected from the group consisting of a carboxylic acid or a derivative thereof, and glycidyl acrylate or methacrylate, said groups selected reactable with the groups contained in said compatibilizing polymer (2), whereby if a glycidyl acrylate or methacrylate is used to functionalize the compatibilizing polymer (2), then the polar ethylene copolymer (3) is functionalized with a carboxylic acid or a derivative thereof, and if a carboxylic acid or derivative thereof is used to functionalize the compatibilizing polymer (2), then the polar ethylene copolymer (3) is functionalized with a glyctdyl acrylate or methacrylate.

2. A flexible polymer composition of claim 1 wherein the reactive groups of the compatibilizing polymer and the reactive groups of the polar ethylene copolymer have reacted.

3. A flexible polymer composition of claim 1 wherein the non-polar thermoplastic polyolefin is polypropylene, high density polyethylene, a linear low density polyethylene, or a blend of one of the above with an ethylene-propylene rubber or an ethylene-propylenediene rubber.

4. A flexible polymer composition of claim 1 wherein the compatibilizing polymer is polypropylene, high density polyethylene, a linear low density polyethylene, an ethylene-propylene rubber, an ethylene-propylenediene rubber, or a blend of any of the above, said compatibilizing polymer grafted with 0.05-2% by weight of glycidyl acrylate or methacrylate.

5. A flexible polymer composition of claim 1 wherein the polar ethylene copolymer consists essentially of:
   (a) 30-80% by weight ethylene;
   (b) 5-60% by weight of vinyl acetate or an alkyl acrylate or alkyl methacrylate, wherein the alkyl group is from 1-8 carbon atoms; and
   (c) 3-30% by weight of carbon monoxide, said polar ethylene copolymer grafted with 0.05-2% by weight of a carboxylic acid or a derivative thereof.

6. A flexible polymer composition of claim 1 wherein the polar ethylene copolymer consists essentially of:
   (a) 56-76% by weight of ethylene;
   (b) 10-34% by weight of vinyl acetate or an alkyl acrylate or alkyl methacrylate, wherein the alkyl group is from 1-8 carbon atoms; and
   (c) 3-15% by weight of carbon monoxide, said polar ethylene copolymer grafted with 0.05-2% by weight of a carboxylic acid or a derivative thereof.

7. A flexible polymer composition of claim 1 wherein the blend comprises 60%-90% by weight of non-polar thermoplastic polyolefin, 5-20% by weight of compatibilizing polymer, and 5-20% by weight of polar ethylene copolymer.

8. A flexible polymer composition of claim 3 wherein the compatibilizing polymer is polypropylene, high density polyethylene, a linear low density polyethylene, an ethylene-propylene rubber, an ethylene-propylenediene rubber, or a blend of any of the above, said compatibilizing polymer grafted with 0.05-2% by weight of glycidyl acrylate or methacrylate; and the polar ethylene copolymer consists essentially of:
   (a) 30-80% by weight of ethylene;

(b) 5–60% by weight of vinyl acetate or an alkyl acrylate or alkyl methacrylate, wherein the alkyl group is from 1–8 carbon atoms; and (c) 3–30% by weight of carbon monoxide, said polar ethylene copolymer grafted with 0.05–2% by weight of a carboxylic acid or a derivative thereof.

9. A flexible composition of claim 8 wherein the blend comprises 60–90% by weight of non-polar thermoplastic polyolefin, 5–20% by weight of compatibilizing polymer, and 5–20% by weight of polar ethylene copolymer.

10. A flexible polymer composition of claim 1 wherein additives are contained in the composition up to 50% by weight of the total composition.

11. A flexible composition of claim 1 in the form of a shaped article.

* * * * *